Dec. 29, 1936.  F. MARGUERRE  2,065,974
THERMODYNAMIC ENERGY STORAGE
Filed Dec. 24, 1934     3 Sheets-Sheet 1

Inventor
Fritz Marguerre
By
Dodge and Sons
Attorneys

Dec. 29, 1936.  F. MARGUERRE  2,065,974
THERMODYNAMIC ENERGY STORAGE
Filed Dec. 24, 1934  3 Sheets-Sheet 2
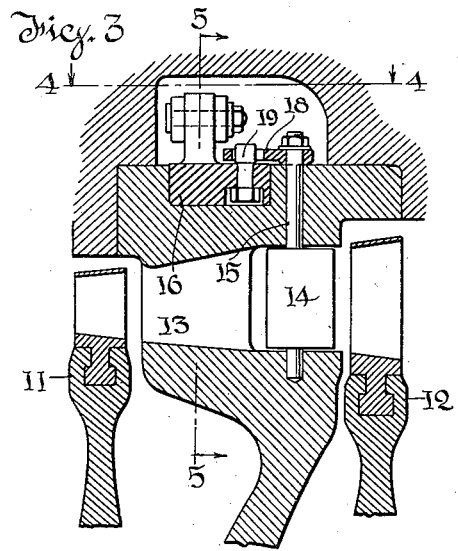
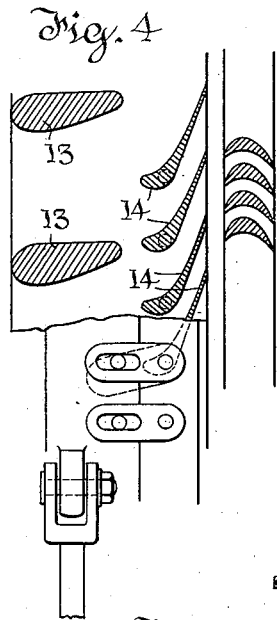
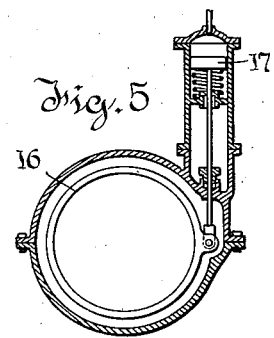
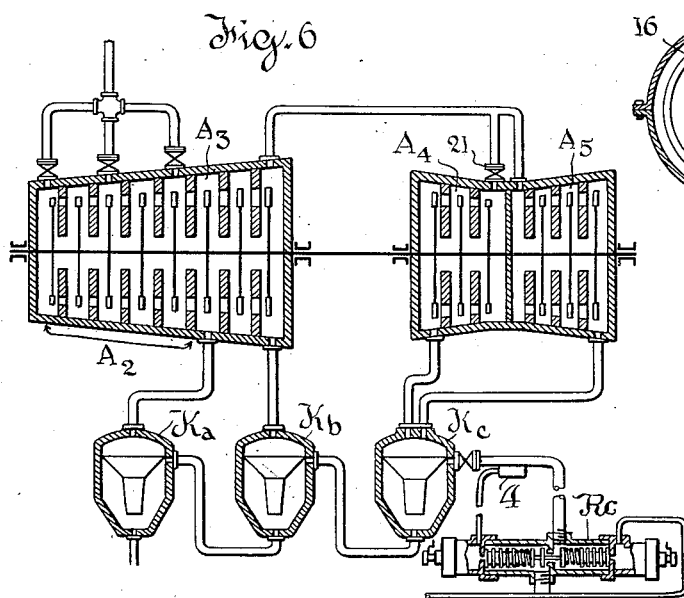
Inventor
Fritz Marguerre
Attorneys Dec. 29, 1936.    F. MARGUERRE    2,065,974
THERMODYNAMIC ENERGY STORAGE
Filed Dec. 24, 1934    3 Sheets-Sheet 3
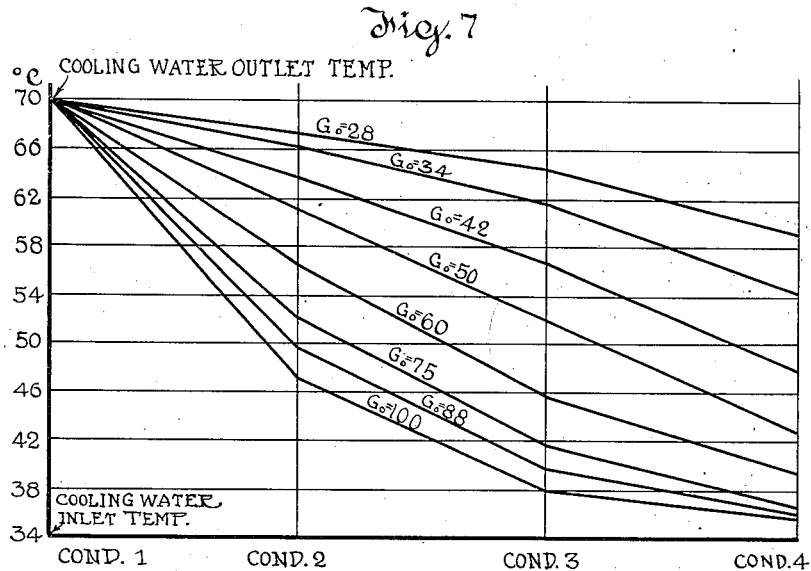
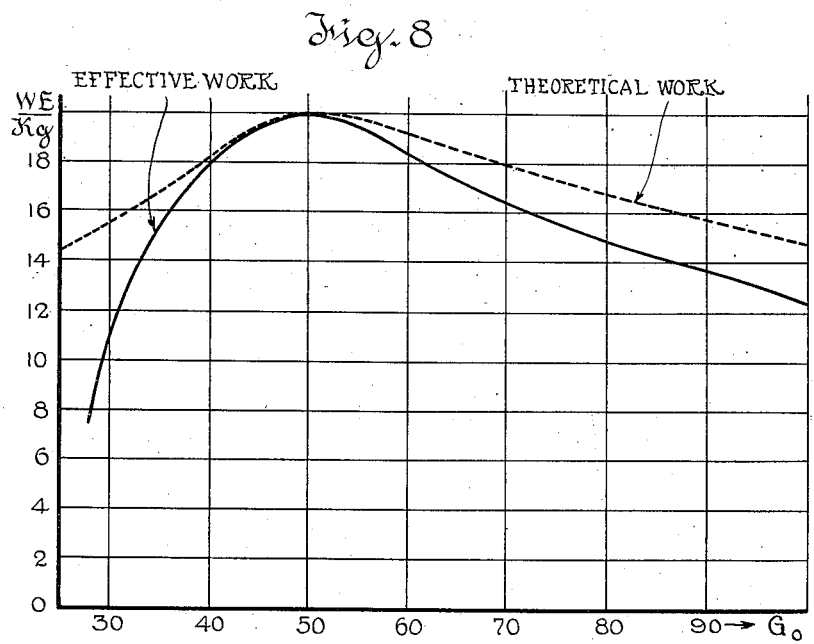

Patented Dec. 29, 1936

2,065,974

UNITED STATES PATENT OFFICE 2,065,974

THERMODYNAMIC ENERGY STORAGE

Fritz Marguerre, Mannheim, Germany

Application December 24, 1934, Serial No. 759,101
In Germany December 23, 1933

8 Claims. (Cl. 60—92)

(Granted under the provisions of sec. 14, act of
March 2, 1927; 357 O. G. 5)

This invention relates to thermodynamic storage and utilization of energy, by the use of a heat pump and a prime mover which may be selectively interposed between a high temperature accumulator (upper accumulator) filled with water and a low temperature accumulator (lower accumulator) also filled with water.

A system of this general type is disclosed and claimed in the Marguerre Patent 1,979,393, granted November 6, 1934. In that patent several specifically different embodiments of the invention there claimed are illustrated, and as illustrated in that patent the high temperature accumulator is associated with a superheat accumulator.

The present invention will be shown, for purposes of explanation, as embodied in a system substantially like that disclosed in Fig. 2 of the above identified Marguerre patent. Inasmuch as the superheat accumulator shown in the patent is not involved in the present invention, and may or may not be used, it is omitted from the drawings of the present application in the interest of simplicity. It should be expressly understood that all the forms of the invention shown in the present application are intended to be illustrative and not limiting.

Preferred embodiments of the invention will now be described in connection with the accompanying drawings, in which,—

Fig. 3 is a sectional view showing an adjustable vane construction suitable for use in the structure of Fig. 2.

Fig. 4 is a section on the line 4—4 of Fig. 3.

Fig. 5 is a reduced scale section on the line 5—5 of Fig. 3 illustrating the motor means for actuating the vane mechanism.

Fig. 6 is a sectional view similar to Fig. 2, and showing a further modification.

Fig. 7 is a temperature diagram for the four condensers of Fig. 1, showing the temperature characteristics of the various condensers for various different total quantities of steam delivered thereto.

Fig. 8 is a diagram of the work performed in the wheels in terms of heat values, referred to the total quantity of steam supplied. The dotted curve is based on the assumption that the efficiency of the various wheels is constant, while the solid line is corrected for variations in efficiency of the wheels produced by variation in drop. Consequently it shows the energy actually available.

Figure 1:
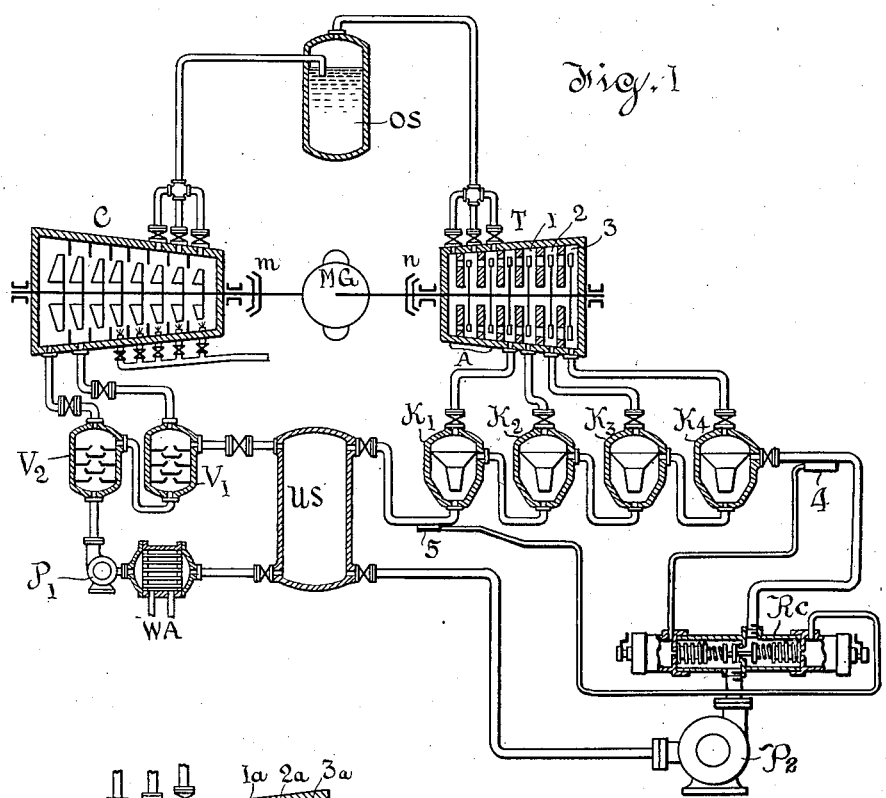
Fig. 1 is a sectional diagram of a system according to Fig. 2 of the aforesaid Marguerre patent with the present invention applied in a form which effects a temperature responsive control of the circulation of condenser cooling water.

It will be helpful to discuss the general operative principles of plants of this sort, and this can be done by reference to Fig. 1.

A stage compressor C draws in steam evaporated from warm water supplied at a low temperature by the lower accumulator US. The compressor takes the steam at low pressure in a plurality of streams from the evaporators V1, V2, the necessary heat for the evaporation being obtained by the cooling of the water in the lower accumulator US. This water is circulated through these evaporators by a pump P1.

Since the steam which is drawn in by the compressor C is compressed thereby, delivered to the upper accumulator OS and condensed in such accumulator, it follows that the heat taken from the lower accumulator US is "pumped" to a high temperature and stored in the upper accumulator OS. This is the charging phase. When it is desired to withdraw energy from the system, steam at relatively high pressure may be taken from the upper accumulator OS and expanded through turbine T.

As a convenient means for driving the compressor C during the energy storage operation and for translating the energy of the turbine T during the energy withdrawing operation, recourse may be had to a motor generator MG. During the energy storage operation this operates as a motor and is clutched to the compressor C to drive the same. During the energy withdrawing operation it is unclutched from the compressor and clutched to the turbine T. It then operates as a generator to translate the energy developed by the turbine. The clutches are indicated at m and n in Fig. 1.

As proposed in the prior patent, the exhaust steam in the power withdrawing operation is taken from a plurality of the lower stages of the turbine T and is condensed in a series of contact condensers K1, K2, K3, K4. The cooling water for these condensers is drawn from the lower accumulator, circulated through the condensers in series by a pump P2 and returned to the accumulator. While the condensers are connected in series with respect to the flow of cooling water, they are connected in parallel with respect to the reception of steam from the various low stages. The steam condensed in these condensers is delivered with the cooling water to the lower accumulator. Thus the lower accumulator stores the heat of exhaust from the turbine and applies such heat to the evaporation step in an ensuing energy storing phase of the operative cycle. Subject to the unavoidable losses, the work done by the turbine in the discharge phase of the cycle corresponds to the energy spent in compressing the steam during the charging phase of the cycle.

While theoretically a single condensing apparatus might be used in place of the plurality of condensers K1 to K4 inclusive, and a single evaporating unit in lieu of the units V1, V2, might be used, in a system of this type multi-stage operation is important, particularly as to the condensers, because it tends to minimize the loss in drop between charge and discharge. There is, however, a difficulty in using a plurality of condensers connected as described, because the operation of the turbine is inefficient whenever the quantity of steam used by the turbine departs from that for which the turbine is designed. The conditions of operation are such that the quantity of steam can not be kept constant at the desired optimum value.

The purpose of the present invention is to eliminate or at least to minimize the resulting losses. This can be explained with reference to the turbine T, Fig. 1. As illustrated here there are six stages in the turbine, of which the first three are indicated as group A and deliver steam to the condenser K1. The remaining or low stages, indicated by the numerals 1, 2 and 3, respectively, deliver their steam to the condensers K2, K3 and K4.

The wheels of stages 1, 2 and 3 are so dimensioned that for a given normal quantity of steam $G_0$ leaving the last wheel of the main group A of the turbine, the same quantity is condensed in each of the four condensers. Consequently three-fourths of the steam passes through wheel 1, one-half through wheel 2, and one-fourth through wheel 3. The water $G_w$ from the lower accumulator which enters the condenser K4 must be heated up by the condensed steam to the same extent to which it was cooled by the previous charging period of the plant. This temperature, therefore, is predetermined, and must be maintained. It is suitably maintained during operation by means of an automatic control arrangement including a valve Rc which determines the rate of flow of the cooling water, and which is arranged to respond to the difference in temperature between 4, the point of cooling water entrance to condenser K4 and 5, the point of discharge of condensing water from the condenser K1.

If the temperature of the water entering the condensers should remain constant, the outlet temperature of the cooling water, and consequently the vacuum in advance of the wheel 1, is independent of the load on the turbine. On the contrary, the intermediate pressures existing in the three remaining condensers vary greatly with the load, that is, with the total quantity of steam to be condensed.

The difference in pressure between two condensers is determined by the portion of the total quantity of steam which passes through the intervening wheel. When the total quantity is reduced the component currents must also be reduced. In other words, the total pressure difference between condenser K1 and condenser K4 must be lowered. The water from the lower accumulator US will be heated most in the coolest condenser since it will there condense the largest quantity of steam. Consequently the vacuum in condensers K2, K3 and K4 goes up. On the other hand, if the weight of steam to be condensed increases, the wheels 1, 2 and 3 can no longer pass the entire quantity of steam and the warmest condenser must take up more than one-quarter of the total steam. As a result, the vacuum in condensers K2, K3 and K4 must decline.

A numerical representation of the resulting temperature variations in the condensers is expressed in the diagram of Fig. 7. This gives, for each condenser, the saturation temperatures of the condensing steam for various total quantities of steam. The diagram is based on the following assumptions: The normal quantity of steam of the turbine amounts to $G_0 = 50$ to/$h$. The inlet temperature of the cooling water stays throughout at 34°, the outlet temperature at 70°. The temperature loss between the saturation temperature of the condensing steam and the hottest water inside a condenser is assumed to be 2° C. for each apparatus. The steam condition of the quantity which leaves the main part A of the turbine is assumed to be 100° C. The figure shows the remarkable extent to which the temperatures inside the condensers K2, K3 and K4 vary when the quantity of steam increases from 28 to 100 to/$h$. The slope of the curves which connect the individual temperature values is a measure of the temperature drop available for the wheels 1—3.

Supplementing this figure, the next Figure 8 shows the work performed in the wheels 1—3 in terms of heat values, heat units per kg., referred to the total quantity $G_0$. The dotted curve is based on the assumption that the efficiency of the wheels remains constant, while the full line curve takes into account the variations in the efficiencies of the wheels produced by variations in drop.

Aside from the scientific theory developed above, general economic laws would lead to the selection, for an average quantity of steam flowing through the turbine during the discharge period, of optimum conditions in the condensers, i. e., by allowing the heating of the water from the lower accumulator to take place in equal stages. The deviation of the quantities of steam from the average value are then at a minimum. In contrast with this, the wheels between the condensers are, in accordance with the present invention, so chosen that, uniform heating of the water of the lower accumulator takes place when the quantity of steam to be condensed is smaller than the average value during the entire discharge period. The deviations from this normal quantity of steam should therefore be larger in an upward direction than in a downward direction, i. e., the vertex of the curve of Fig. 8 should lie below the average steam consumption.

The losses of drop having now been explained, the means used to avoid or minimize these losses can be understood. With respect to each of the stages 1, 2 and 3, the steam current is divided into a fraction which is immediately condensed in the corresponding condenser and a complementary fraction which flows through the next wheel.

The principle underlying the subdivision of the steam is that the fraction which is condensed must be such that the resulting heating of the cooling water establishes the desired pressure difference between that and the adjacent condenser so as to force the complementary fraction of the steam through the turbine wheel which lies between the two condensers. Since this difference of pressure depends appreciably on the specific volume of the steam (inasmuch as for the same quantity of steam a large volume requires a higher velocity and therefore a greater drop in pressure than a small volume) it would be desirable to regulate this volume in such a manner that, in the case of small volumes, where, as shown in Fig. 7, the drop between the individual wheels is considerably reduced, it becomes larger than in the normal case for which the machine is designed, and that, conversely it becomes smaller in the case of large quantities of steam.

The desired regulation of specific volume may be secured, according to this invention, by the control exercised by the controller Rc in response to its thermostatic means 4, 5. Water entering the condenser K4 from the lower accumulator must be heated up by steam from the turbine by an amount equal to that by which it was cooled during the previous charging period of the plant. This temperature is predetermined and is suitably maintained during operation by means of an automatic control Rc. This control is influenced by the temperature of the incoming and outgoing water. The quantity of cooling water varies then continually to the same extent as the quantity of steam to be condensed. Controller Rc regulates the water flowing from the lower accumulator to the condenser in such manner that in the case of large quantities of steam the heating effect is greater and in the case of small quantities of steam less, and so that the average value for the entire discharge period corresponds to a predetermined desirable average. The effect is that during the period of overload a reduction of the specific volume of the individual exhaust currents is secured, while during partial loads a commensurate increase is secured.

The regulation of the specific volume of the individual steam currents secured by such regulation of cooling water flow affects not only the drop and the efficiency of the various stages lying between the condensers, but also affects the drop and the efficiency of the last wheel in the main portion A of the turbine, for in this case also there is an equalization of the unavoidable variations in the volume of steam passing the main portion A.

In addition to this method of regulation (or in lieu thereof, in cases where control of the cooling water is undesirable) a reduction of losses may be obtained by adopting the expedient illustrated in Figs. 2 to 5 inclusive.

Figure 2:
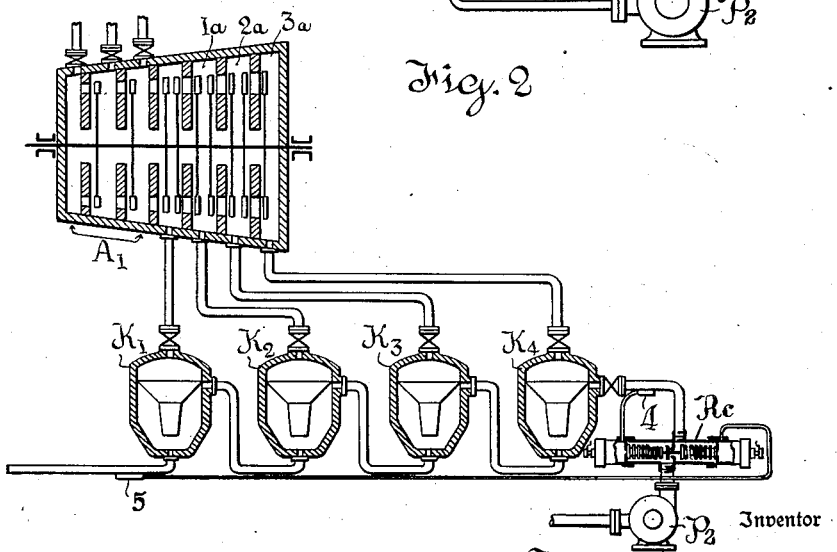
Fig. 2 is a fragmentary view showing the substitution in the system of Fig. 1 of a multi-stage turbine in which the lower stages are provided with means for controlling the resistance to flow of steam. This arrangement may be used in lieu of the temperature control illustrated in Fig. 1, but is preferably used in conjunction therewith and is so illustrated.

Referring first to Fig. 2, the turbine T1 has, like the turbine T, six stages, of which the first three form the main group A1. The last three stages are indicated at 1a, 2a and 3a and are so constructed that regulation of resistance to flow of steam through each stage is attainable. In this way the distribution of steam flow through the low stages is controlled directly instead of being controlled by the temperature in the condensers.

Fig. 2 indicates a construction in which the last three stages comprise each two wheels with an intervening adjustable guide structure. One feasible construction of such mechanism is illustrated in detail in Figs. 3 to 5 inclusive.

Referring to these figures, the two wheels of one stage are indicated at 11 and 12. The intervening guide structure is made up of two parts, a set of fixed vanes 13 and a set of adjustable vanes 14. The vanes 14 are angularly adjustable by rotating the shafts 15 and these shafts are rotated in unison by a ring 16 which encircles the entire guide structure and may be shifted by a pressure motor 17. Each of the shafts 15 carries a slotted arm 18 which is engaged by a corresponding lug 19 fixed in the ring 16. No particular novelty is claimed for this mechanical structure, and it is illustrated merely as one means by which the vanes 14 may be adjusted in unison to vary the resistance to flow between the wheels 11 and 12. These two wheels, together with the guide structure, make up a single stage.

The scheme disclosed in Figs. 2 to 5 inclusive requires special construction of the turbine and for that reason is not always economically desirable. It can be used independently of the controller Rc already described but preferably is used in conjunction therewith, as illustrated in Fig. 2.

Another modification is illustrated schematically in Fig. 6 where only three condensers Ka, Kb and Kc are used in lieu of the four condensers K1 to K4 of Figs. 1 and 2. In this case the main portion of the turbine is indicated at A2. The condenser Ka is connected between the discharge of portion A2 and the entrance to the intermediate stage A3. The low stage is made up of two units A4 and A5 connected in parallel. The condenser Kb is connected between the discharge of the unit A3 and the common entrance to the two units A4 and A5. The discharges from the units A4 and A5 are connected in parallel with the condenser Kc. A valve 21 may be closed to shut off the admission of steam to the unit A4. By opening and closing the valve 21 the resistance to flow through the final unit A4, A5, may be varied.

The results are thermodynamically similar to those secured by the adjustment of the vanes 14 described with reference to Figs. 2 to 5 inclusive. The arrangement of Fig. 6 is useful where particularly wide variations in the quantity of steam are to be encountered, and the scheme may be used in conjunction with or without the regulator Rc. Ordinarily the conjoint use of the two regulating means will give better control.

According to the laws of thermodynamics the vacuum—i. e., the final pressure on expansion—is determined in the case of jet condensers by the temperature to which the water in the condensers is heated and not by the inlet temperature; conversely, in the case of an evaporator, from which a compressor draws, the pressure is determined by the temperature to which the water is cooled and not by the inlet temperature. It follows from this: if the temperature of the lower accumulator before the compression period be 70°, and thereafter 34°, and if suction be applied in a single stage to an evaporator, through which passes the water of the lower accumulator, then the suction pressure corresponds to 34° and during the expansion period the water is again heated up from 34° to 70°, so that the expansion pressure corresponds to 70°. The temperature difference of the water in the lower accumulator between charge and discharge is thus the "loss in drop" between charge and discharge and amounts to 36°. If this temperature difference be subdivided into, for example, four parts, then the temperatures which determine the suction pressure are: 34°, 43°, 52°, 61° and those that determine the expansion pressure are: 43°, 52°, 61°, 70°. The loss in drop has therefore been reduced from 36° to 9°.

The application of the above theory is clear. The pressure drop in the lowest stages of the turbine, i. e., the pressure required to propel a given quantity of steam, positively increases with reduction in the quantity of steam. The temperature difference between the condensers therefore becomes less as otherwise there could be no balance. Since, however, the full temperature of this cooling water is kept up by thermostatic means, for example, from 34° to 70°, there can result a single adjustment only of the temperature and pressure to, for example, 60, 64, 67, 70; the large differential between 34° and 60° is not applied to any part of the turbine. There results from this the claimed increase of drop loss since, in the case of a partial load on the turbine, the mean expansion pressure has increased from $$\frac{42+52+63+70}{4}$$

at full load to $$\frac{60+64+67+70}{4}.$$

The converse takes place with a quantity of steam above normal. In the latter case, however, the conditions are relatively more favorable.

Fig. 7 shows the temperature course for different quantities of steam and is, in fact, the desired diagram, since the indicated temperature differences correspond to the pressure differences, which are calculated for the corresponding quantities of steam in the individual turbine stages. In Fig. 8 the dotted line shows the theoretically available energy, and the full line the energy actually available as a result of impairment of wheel efficiency. It follows from the relations shown in the diagrams that the unfavorable portion of the curve may be avoided, and that the loss which is thereby obtained on normal load is appreciably less than that which would be the case on partial load. The above examples apply only to unchanged cross-sections in the last turbine stages; by changing the cross-section it is possible to vary the pressure drop on partial loads and thereby avoid the disadvantages, as will be clear from the above explanation.

Generally stated, the invention is in the nature of an improvement on the method and apparatus disclosed in the patent above identified, and has to do with that phase of the operative cycle in which steam is flowing from the upper accumulator to the lower accumulator through the turbine. In other words, it has to do with the discharging phase of the operative cycle of the storage system.

The present invention is specifically concerned with the distribution of steam flow between the low stages and the condensers either by control of the cooling water or by direct control of the flow of steam between stages, or by both.

While representative embodiments have been described, the invention is broader than any particular means for carrying out the regulation, and can be modified according to principles set forth in the above disclosure. It is anticipated that the invention will be carried out by the use of various specifically different installations. The scope of the invention is defined by the claims and is not limited to the mechanism above set forth.

What is claimed is,—

1. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; and means responsive to the temperature rise of cooling water in flowing through the series of condensers for controlling the rate of flow of such water.

2. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; and means for varying the resistance to steam flow through individual low stages.

3. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; means responsive to the temperature rise of cooling water in flowing through the series of condensers for controlling the rate of flow of such water; and means for varying the resistance to steam flow through individual low stages.

4. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from a succession of lower stages of said turbine and delivering said steam condensed in said cooling water to the low temperature accumulator; controllable means for circulating said cooling water; and means responsive to the difference between entrance and discharge temperatures of water flowing through said series of condensers for controlling the rate of flow of said water.

5. A thermodynamic storage system, comprising in combination a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; and means responsive to the difference between entrance and discharge temperatures of water flowing through said series of condensers for controlling the rate of flow of said water.

6. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; means responsive to the temperature rise of cooling water in flowing through the series of condensers for controlling the rate of flow of such water; and means for apportioning the flow of steam to said condensers, whereby the condensers are caused to condense approximately equal weights of steam irrespective of variations in the total rate of steam flow.

7. A thermodynamic storage system, comprising in combination, a high temperature accumulator; a low temperature accumulator; a multi-stage steam turbine arranged to be operated by flow of steam from the high to the low temperature accumulator; a plurality of contact condensers arranged for serial flow through them of cooling water circulated from and back to the low temperature accumulator, said condensers receiving steam in parallel from corresponding ones of a plurality of lower stages of said turbine and delivering said steam condensed in said cooling water to the low temperature accumulator; controllable means for circulating said cooling water; means responsive to the temperature rise of cooling water in flowing through the series of condensers for controlling the rate of flow of such water; and means exercising a direct control on the flows through individual low stages in such relation that irrespective of variations in the total rate of steam flow the various condensers receive and condense approximately equal weights of steam.

8. A thermodynamic storage system comprising a high temperature accumulator; a low temperature accumulator; a multi-stage steam turbine arranged to be operated by steam flow from the high temperature accumulator to the low temperature accumulator; a plurality of serially connected condensing means arranged to condense steam from certain of the lower stages of the turbine; and means for so apportioning the pressure drops among the lower stages of the turbine that the vertex of a curve in which heat values are plotted with reference to the total quantity of steam supplied to the turbine never rises above a line plotted to indicate average steam consumption.

FRITZ MARGUERRE.